(12) United States Patent
Schaffer et al.

(10) Patent No.: US 10,275,910 B2
(45) Date of Patent: Apr. 30, 2019

(54) INK SPACE COORDINATE SYSTEM FOR A DIGITAL INK STROKE

(71) Applicant: Microsoft Technology Licensing, LLC, Redmond, WA (US)

(72) Inventors: Simon J. Schaffer, Seattle, WA (US); Christine M. Johnson, Redmond, WA (US); Travis P. Dorschel, Issaquah, WA (US); Craig A. Macomber, Seattle, WA (US); Joshua M. Smithrud, Issaquah, WA (US); Michael Tang, Seattle, WA (US); Paul J. Kwiatkowski, Redmond, WA (US); Taylor S. Williams, Seattle, WA (US); James Robert Olyha, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/871,923

(22) Filed: Jan. 15, 2018

(65) Prior Publication Data

US 2019/0096100 A1 Mar. 28, 2019

Related U.S. Application Data

(60) Provisional application No. 62/562,933, filed on Sep. 25, 2017, provisional application No. 62/566,242, filed on Sep. 29, 2017.

(51) Int. Cl.
*G06T 11/20* (2006.01)
*G06T 3/00* (2006.01)

(52) U.S. Cl.
CPC .......... *G06T 11/203* (2013.01); *G06T 3/0093* (2013.01)

(58) Field of Classification Search
CPC .......................... G06T 11/203; G06T 3/0093
(Continued)

(56) References Cited

U.S. PATENT DOCUMENTS

| 5,434,959 A | 7/1995 | Von Eh et al. |
| 6,268,865 B1 | 7/2001 | Daniels et al. |

(Continued)

OTHER PUBLICATIONS

"Corel® Painter™ 8", Retrieved From <<https://web.archive.org/web/20030805145426/http:/www.corel.com/content/pdf/painter8/tutorials/Liquid_Ink.pdf>>, Aug. 5, 2003, pp. 1-32.
(Continued)

*Primary Examiner* — King Y Poon
*Assistant Examiner* — Vincent Peren
(74) *Attorney, Agent, or Firm* — Talem IP Law, LLP

(57) ABSTRACT

Techniques and systems for managing visual layouts of ink strokes are described. In particular, an ink space coordinate system for a digital ink stroke is provided. A digital ink system can receive ink stroke data of an ink stroke. The system can define an ink space coordinate system along the ink stroke. Defining the ink space coordinate system can include assigning a reference line of the ink stroke and an origin point on the reference line, as well as creating ink space coordinates. Creating the ink space coordinates can include defining ink space x-coordinate values representing a distance along the reference line relative to the origin point and defining ink space y-coordinate values representing a distance along an axis perpendicular to the reference line of the ink stroke. Then the system can perform a warping to create curvature in the ink space coordinate system.

17 Claims, 18 Drawing Sheets

(58) Field of Classification Search
USPC .......................................................... 345/469
See application file for complete search history.

(56) References Cited

U.S. PATENT DOCUMENTS

| | | | |
|---|---|---|---|
| 7,158,138 B1* | 1/2007 | Bronskill | G06T 11/001 |
| | | | 345/441 |
| 7,427,984 B2 | 9/2008 | Smirnov et al. | |
| 8,487,963 B1 | 7/2013 | Harris et al. | |
| 9,192,874 B2 | 11/2015 | Moll et al. | |
| 2004/0233196 A1 | 11/2004 | Hertzmann | |
| 2007/0268304 A1 | 11/2007 | Hsu | |
| 2008/0266309 A1 | 10/2008 | Sander et al. | |
| 2011/0304643 A1* | 12/2011 | Marison | G06F 3/04883 |
| | | | 345/611 |
| 2013/0057540 A1 | 3/2013 | Winnemoeller et al. | |
| 2013/0342560 A1 | 12/2013 | Joshi | |
| 2014/0355884 A1 | 12/2014 | Tran et al. | |
| 2015/0347000 A1 | 12/2015 | Ookawara | |
| 2016/0034752 A1 | 2/2016 | Tung | |
| 2016/0232146 A1 | 8/2016 | Su et al. | |
| 2016/0253300 A1 | 9/2016 | Tu et al. | |
| 2017/0139556 A1 | 5/2017 | Josephson | |
| 2017/0212612 A1 | 7/2017 | Zhou | |
| 2017/0236318 A1 | 8/2017 | Ellbogen et al. | |

OTHER PUBLICATIONS

"Glitterati", Retrieved From <<https://itunes.apple.com/us/app/glitterati/id410052281?mt=8>>, Oct. 11, 2012, 2 Pages.

"OneNote July roundup", Retrieved From <<https://blogs.office.com/en-us/2016/07/21/onenote-july-roundup/>>, Jul. 21, 2016, 5 Pages.

"Providing Erasers", Retrieved From <<https://msdn.microsoft.com/en-us/library/ms698143(v=vs.85).aspx>>, Aug. 2, 2011, 2 Pages.

Bowden, Zac, "Windows Ink: How to use Screen Sketch", Retrieved From <<https://www.windowscentral.com/windows-ink-how-use-screen-sketch>>, Sep. 26, 2016, 15 Pages.

"Non Final Office Action Issued in U.S. Appl. No. 15/871,928", dated Sep. 11, 2018, 9 Pages.

"Non Final Office Action Issued in U.S. Appl. No. 15/872,821", dated Sep. 7, 2018, 65 Pages.

"International Search Report and Written Opinion Issued in PCT Application No. PCT/US18/039208", dated Sep. 17, 2018, 13 Pages.

* cited by examiner

INK SPACE COORDINATE SYSTEM FOR A DIGITAL INK STROKE

CROSS REFERENCE TO RELATED APPLICATIONS

This application claims the benefit of U.S. Provisional Application Ser. No. 62/562,933, filed Sep. 25, 2017 and U.S. Provisional Application Ser. No. 62/566,242 filed Sep. 29, 2017.

BACKGROUND

Content creation applications such as notebook applications, word processing applications, spreadsheet applications, and presentation applications are useful tools for generating and curating content. These and other content creation applications are increasingly including "inking" functionality that lets users input content and interact with the application (and content created therein) through using a pen or stylus (and sometimes fingers or other objects) in a manner evoking a pen on paper. Digital ink can imitate real writing utensils such as pens, pencils or paintbrushes, or it can be used to create visual effects that have no real-world analog. A wide variety of ink effects are continually desired.

BRIEF SUMMARY

Techniques and systems for managing visual layouts of ink strokes are described. In particular, an ink space coordinate system for a digital ink stroke is provided.

A digital ink system can receive ink stroke data of an ink stroke. The system can define an ink space coordinate system along the ink stroke. Defining the ink space coordinate system can include assigning a reference line of the ink stroke and an origin point on the reference line, as well as creating ink space coordinates. Creating the ink space coordinates can include defining ink space x-coordinate values representing a distance along the reference line relative to the origin point and defining ink space y-coordinate values representing a distance along an axis perpendicular to the reference line of the ink stroke. Then the system can perform a warping to create curvature in the ink space coordinate system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
FIG. 1A illustrates an example scenario of applying a rainbow ink effect to the drawing of an ink stroke based on x-coordinate values without using an ink space coordinate system.

Techniques and systems for managing visual layouts of ink strokes are described. In particular, an ink space coordinate system for a digital ink stroke is provided.

A digital ink system can receive ink stroke data of an ink stroke. The system can define an ink space coordinate system along the ink stroke. Defining the ink space coordinate system can include assigning a reference line of the ink stroke and an origin point on the reference line, as well as creating ink space coordinates. It should be understood that although reference "line" is used, the line is actually a path through a set of line segments connecting the ink points.

Creating the ink space coordinates can include defining ink space x-coordinate values representing a distance along the reference line relative to the origin point and defining ink space y-coordinate values representing a distance along an axis perpendicular to the reference line of the ink stroke. Then the system can perform a warping to create curvature in the ink space coordinate system. The curvature may be created because a digital ink stroke has the property of being comprised of discrete ink segments.

The ink space coordinate system may be a mathematical Cartesian space that is bent into shape along the width and length of the ink stroke. The ink space coordinate system is generated before rendering of the ink stroke. A "point" in the ink space coordinate system of an ink stroke can include a rasterized point within an outline of the ink stroke. For example, the point in the ink space coordinate system can include a pixel within the outline of the ink stroke.

The described techniques are applicable for any application that supports "inking" or "digital ink", which refers to the mode of user input where a stylus or pen (or even user finger on a touch screen or pad or possibly a mouse) is used to capture handwriting in its natural form.

A digitizer generally provides a set of coordinates on a grid that can be used to convert an analog motion into discrete coordinate values. A digitizer may be laid under or over a screen or surface that can capture the movement of a finger, pen, or stylus (e.g., the handwriting or brush strokes of a user). Depending on the features of the digitizer, information such as pressure, speed of motion between points, and direction of motion can be collected.

Ink stroke data refers to a set of properties and point data that a digitizer captures that represent the coordinates and properties of a "marking". It can be the set of data that is captured in a single pen down, up, or move sequence. The set of data can include parameters such as, but not limited to, position, a beginning of the stroke, an end of the stroke, the pressure of the stroke, the tilt (e.g., of a pen) for the stroke (can also be referred to as the azimuth), the direction of the stroke, the time and timing of the stroke between discrete coordinates along the path of the stroke, and the color of the 'ink'. It should be understood that some of the ink stroke data may be metadata on the ink stroke itself, and some of the ink stroke data may be metadata per ink point.

The ink stroke data of an ink stroke can include a set of ink points, as well as a set of ink segments that connect two adjacent ink points. The ink points can be represented as a nib shape. Nib shape refers to the shape of the pen that a user is drawing with. The nib shape may be, but is not limited to, a circle, an ellipse, or a rectangle. As used herein, an ink point of an ink stroke can include the ink point and the shape of the nib; and an ink segment of the ink stroke can include the entire geometry of the nib shape used.

As a first approximation, "ink space" or "ink space coordinate system" comprises two ink space coordinates representing the distance along the ink stroke and the distance from a reference line. Since an ink stroke comprises a sequence of straight line segments, a naïve implementation of these two ink space coordinates would result in a space with discontinuities when the stroke is curving, e.g., non-adjacent points in the ink space coordinate system would appear adjacent on-screen, and some points in ink space coordinate system would appear nowhere on screen. The techniques described herein therefore "warps" the ink space coordinate system so it is continuous and produces realistic effects that follow the curvature of the ink stroke. When the ink stroke curvature is large relative to the thickness of the stroke, this warping can be quite dramatic.

The ink space coordinate values are associated with the ink stroke and are generated before rendering the ink stroke. Future calculations and interpolations can take advantage of the ink space coordinate system. Since the ink space coordinate system helps define how an ink effect flows with the curve of the ink stroke, a more realistic ink effect can be rendered. Therefore, positions on the ink stroke can be identified using the ink space coordinate system, allowing complicated and detailed ink effects to be positioned along the ink stroke with minimal discontinuities.

Figure 1B:
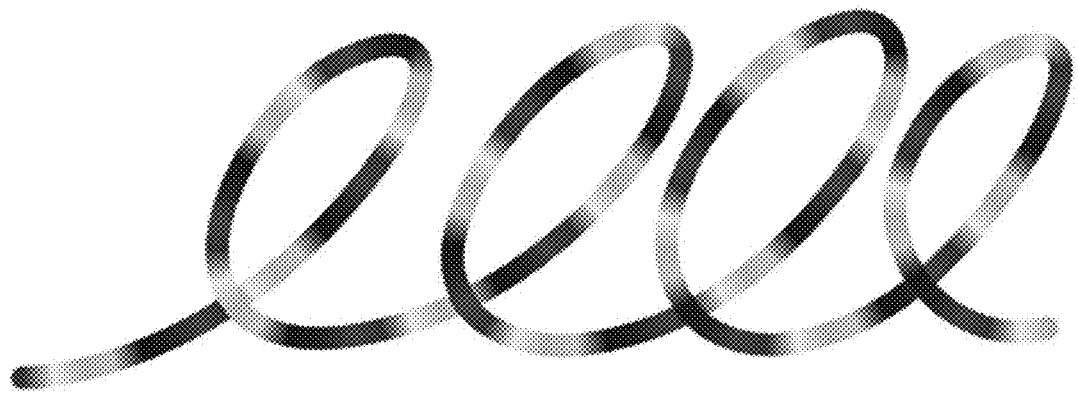
FIG. 1B illustrates an example scenario of applying a rainbow ink effect to the drawing of an ink stroke based on ink space x-coordinate values using an ink space coordinate system.

FIG. 1A illustrates an example scenario of applying a rainbow ink effect to the drawing of an ink stroke based on x-coordinate values without using an ink space coordinate system; and FIG. 1B illustrates an example scenario of applying a rainbow ink effect to the drawing of an ink stroke based on ink space x-coordinate values using an ink space coordinate system.

In the example of FIG. 1A, the rainbow ink effect is applied to the ink stroke without using the ink space coordinate system. In cases where an ink effect is applied to an ink stroke without using the ink space coordinate system, the 2D position at which a point in the ink stroke is drawn is used to calculate the color of that point in the ink stroke. The 2D position refers to the coordinate system ("canvas space") of the canvas in which the ink stroke is drawn. Canvas space is an affine transformation from the natural coordinate system (i.e. "clip space") used in modern graphics rendering.

The ink stroke can be thought of as being drawn over a grid of the canvas space. The ink stroke's x-coordinate would be along the grid of the canvas space. Therefore, when the color of the ink stroke is based on the x-coordinate value along the canvas space, the transitioning of the colors of the rainbow effect are associated with the x-coordinate values of the canvas space as shown in FIG. 1A. When using the canvas space, there may no indication of the position of the coordinate within the ink stroke, and, thus, no indication where the ink stroke overlaps on itself. It should be understood that other coordinate systems may be used for different ink effects and rendering of objects on the screen; and canvas space and ink space are just two examples.

Referring to FIG. 1B, the rainbow ink effect is applied to the ink stroke using the ink space coordinate system. In the example of FIG. 1B, the grid of the ink space coordinate system can be can be thought of as being drawn within the outline of the ink stroke. The x-axis of the ink space coordinate system follows along through the length of the ink stroke. Therefore, the color of a given point in the ink stroke is not based on the position within the canvas at which it is drawn, but rather follows the ink stroke. As can be seen in FIG. 1B, the transitioning of the colors of the rainbow effect are able to follow the ink stroke, which is a result of using the x-coordinate values of the ink space coordinate system.

Figure 1C:
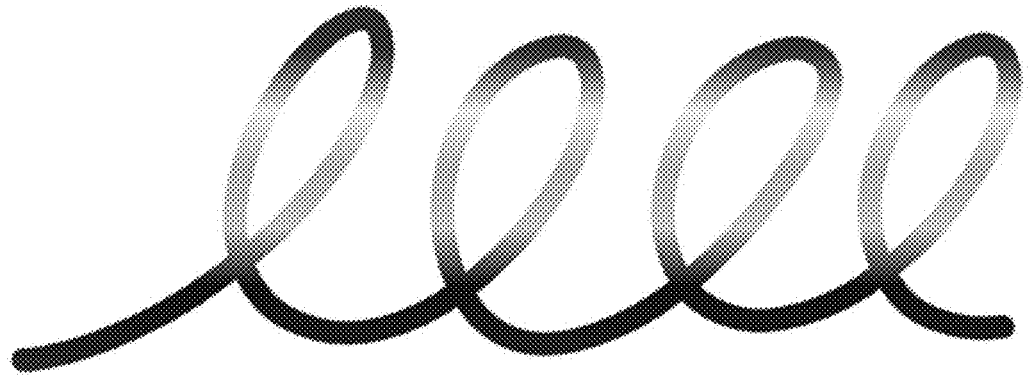
FIG. 1C illustrates an example scenario of applying a rainbow ink effect to the drawing of an ink stroke based on y-coordinate values without using an ink space coordinate system.
Figure 1D:
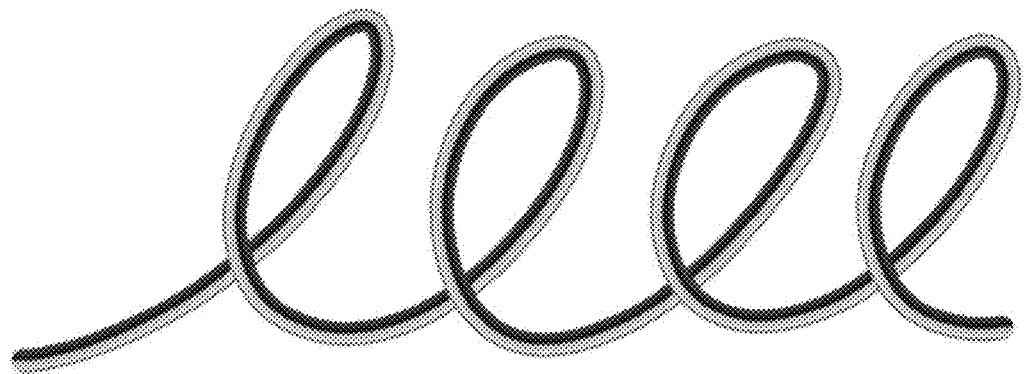
FIG. 1D illustrates an example scenario of applying a rainbow ink effect to the drawing of an ink stroke based on ink space y-coordinate values using an ink space coordinate system.

FIG. 1C illustrates an example scenario of applying a rainbow ink effect to the drawing of an ink stroke based on y-coordinate values without using an ink space coordinate system; and FIG. 1D illustrates an example scenario of applying a rainbow ink effect to the drawing of an ink stroke based on ink space y-coordinate values using an ink space coordinate system.

In the example of FIG. 1C, the rainbow ink effect is applied to the ink stroke without using the ink space coordinate system. As previously described, in cases where an ink effect is applied to an ink stroke without using the ink space coordinate system, the 2D position at which a point in the ink stroke is drawn in the canvas is used to calculate the color for that point in the ink stroke.

Therefore, when applying the rainbow ink in this scenario, the color of a point in the ink stroke is based on the y-coordinate value of the canvas space at which it is drawn, which results in the transitioning of the colors of the rainbow effect as shown in FIG. 1C.

In contrast, in the example of FIG. 1D, the rainbow ink effect is applied to the ink stroke using the ink space coordinate system. As can be seen in FIG. 1D, the transitioning of the colors of the rainbow effect are associated with the y-coordinate values of the ink space coordinate system, which results in the colors following the shape of the ink stroke.

Figure 1E:
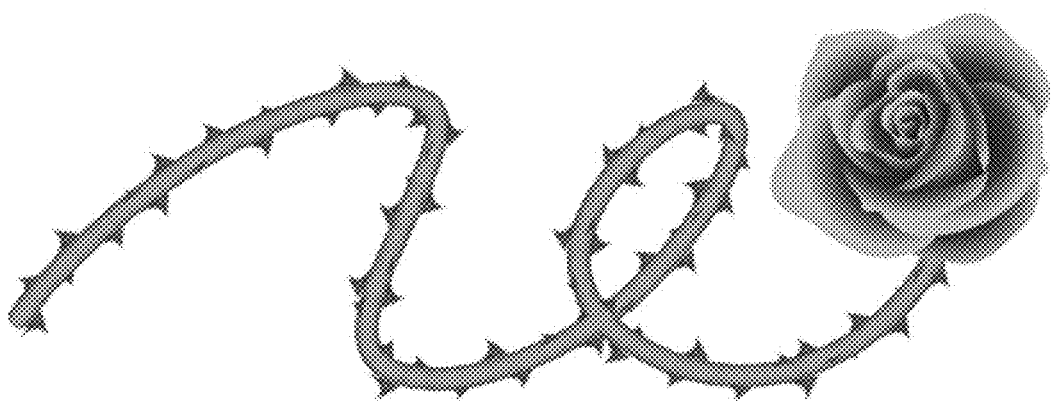
FIG. 1E illustrates an example scenario of applying a rose stem ink effect to the drawing of an ink stroke using ink space x-coordinate values of an ink space coordinate system.

FIG. 1E illustrates an example scenario of applying a rose stem ink effect to the drawing of an ink stroke using ink space x-coordinate values of an ink space coordinate system. Referring to FIG. 1E, an ink stroke having a rose stem ink effect is shown. As can be seen, the rose stem ink effect can include a shaded stem with thorns along the length of the ink stroke. Using the ink space coordinate system, the thorns can be positioned along the ink stroke using the ink space x-coordinate. If the rose stem ink effect was applied using canvas space, as described in FIGS. 1A and 1C, for the placement of the thorns, they would not be oriented properly (e.g., would not look like they are placed along the ink stroke).

Figure 2A:
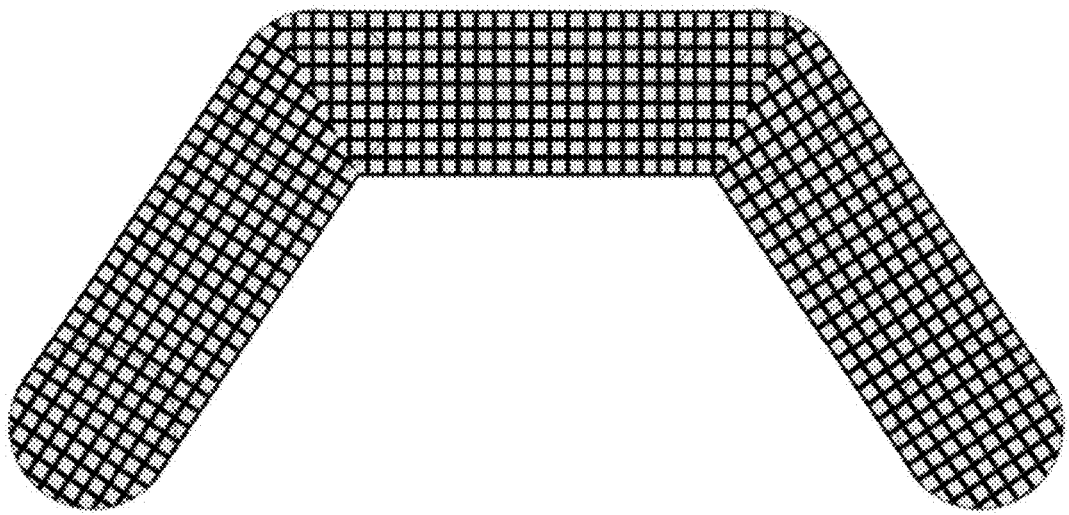
FIG. 2A illustrates an example representation of an ink stroke having an ink space coordinate system prior to performing a warping.
Figure 2B:
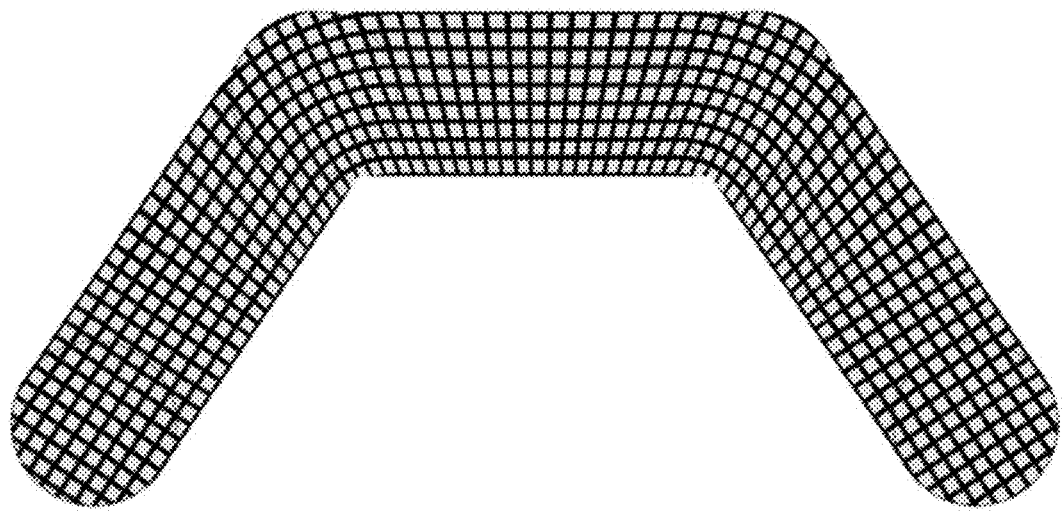
FIGS. 2B and 2C illustrate example representations of an ink stroke having an ink space coordinate system after performing a warping.

FIG. 2A illustrates an example representation of an ink stroke having an ink space coordinate system prior to performing a warping; and FIG. 2B illustrates an example representation of an ink stroke having an ink space coordinate system after performing a warping. In FIGS. 2A and 2B, an ink stroke that includes four ink points and three ink segments is shown for simplification.

Referring to FIG. 2A, an ink space coordinate system is shown for the ink stroke prior to the ink space coordinate system being warped. As can be seen, sharp cusps and jumps can be produced at any corners where adjacent ink segments meet.

If no warping is performed at a portion of the ink stroke that has a curve (e.g., corners produced by adjacent ink segments), the ink space coordinate system can result in a space with discontinuities when the stroke is curving.

Referring to FIG. 2B, an ink space coordinate system is shown for the ink stroke after warping. The ink space x-coordinate values can be warped to follow the curvature of the ink stroke. The ink space y-coordinate values can be warped to smooth the transitions between adjacent ink segments to produce a curving transition as opposed to the sharp cusp.

As can be seen, the sharp cusps produced at any corners where adjacent ink segments meet have been smoothed and the ink space coordinate system follows the curvature of the ink stroke.

Figure 2C:
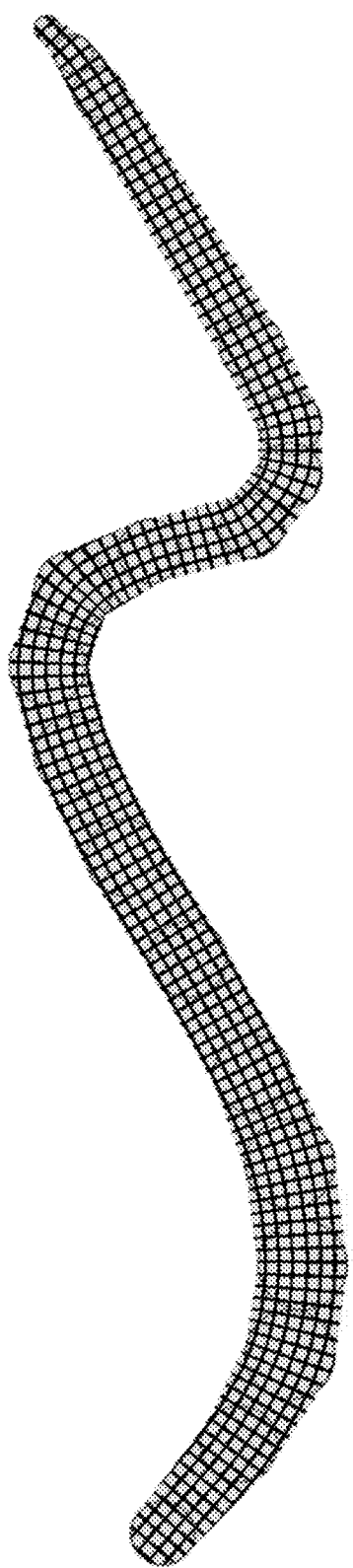

FIG. 2C illustrates the warping effect over a longer ink stroke. As can be seen in FIG. 2C, any sharp cusps produced at any corners where adjacent ink segments meet have been smoothed and the ink space coordinate system follows the curvature of the ink stroke.

Figure 3A:
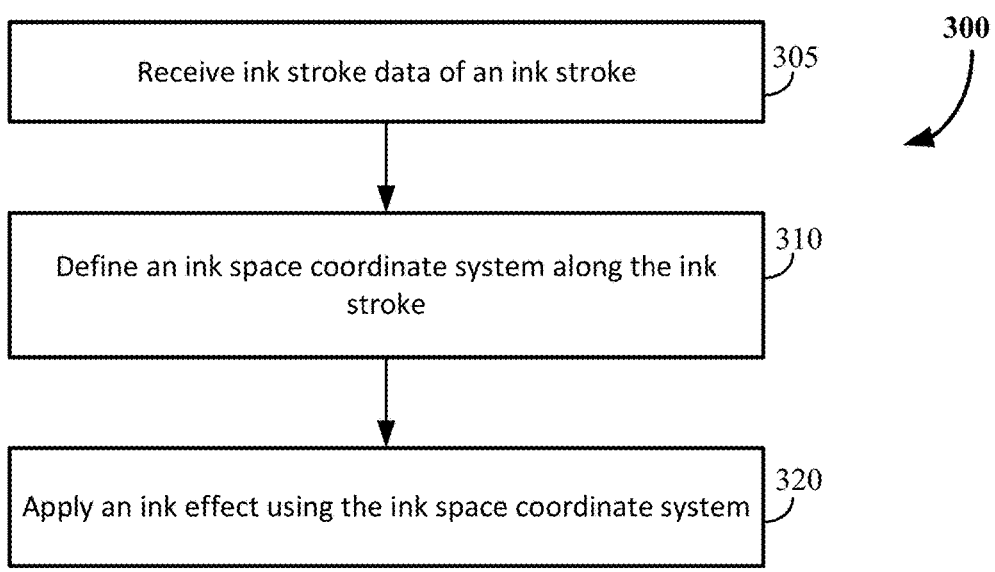
FIGS. 3A, 3B, 3C, and 3D illustrate example process flow diagrams for a method for managing visual layouts of ink strokes.
Figure 3B:
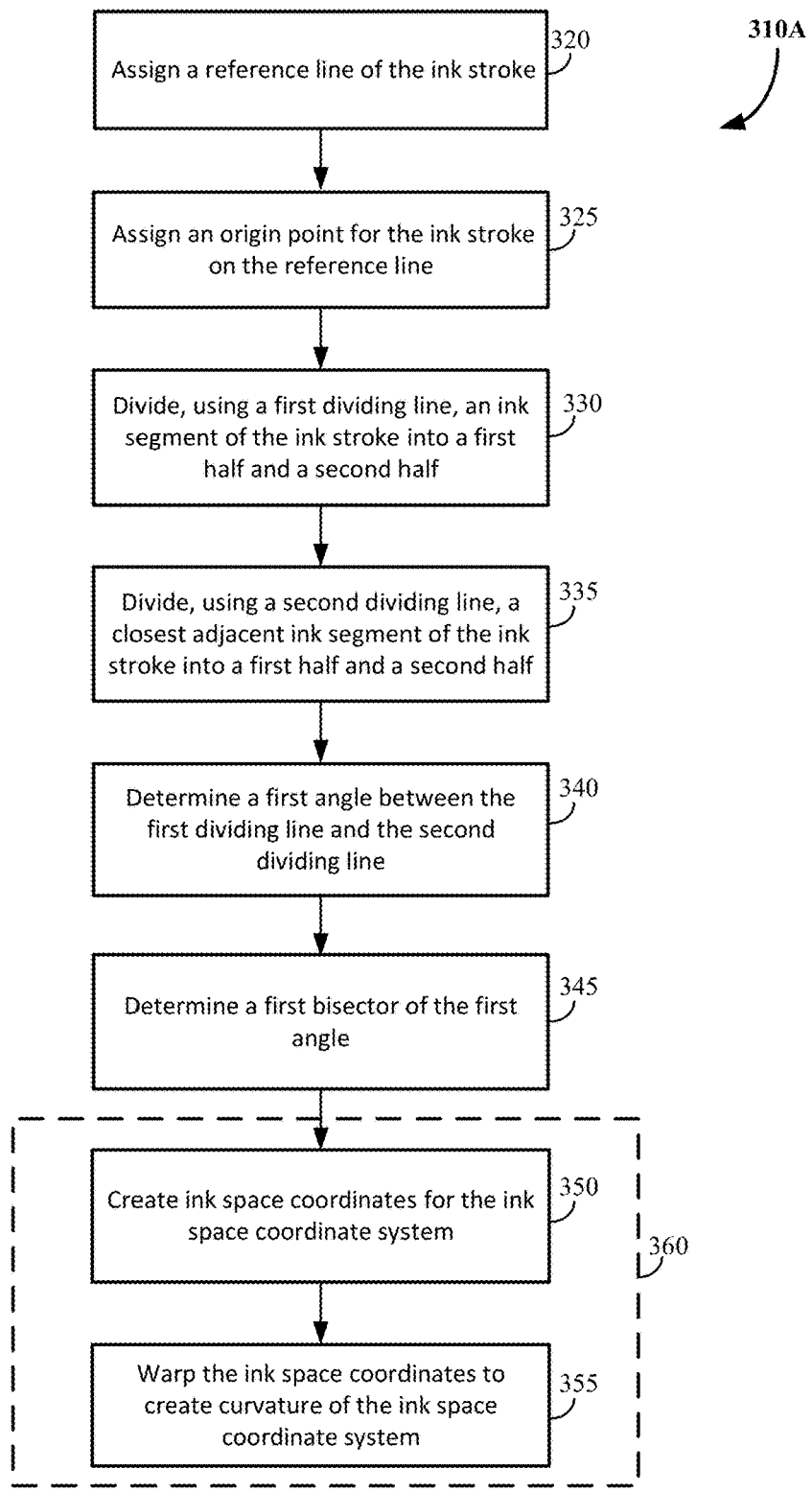

FIG. 3A illustrates an example process flow diagram for a method for managing visual layouts of ink strokes. Process 300 of FIG. 3A includes operations 305, 310, and 315. FIG. 3B shows one example of operation 310 carried out as process 310A.

Referring to FIG. 3A, process 300 begins with the digital ink system receiving (305) ink stroke data of an ink stroke. As previously described, the ink stroke data can include a set of ink points connected by ink segments. An ink space coordinate system can be defined (310) along the ink stroke. Then, an ink effect can be applied (315) using the ink space coordinate system. A variety of ink effects, such as the rainbow ink and the rose with thorns described in FIGS. 1B, 1D, and 1E, can be applied.

Advantageously, the ink space coordinate system can be interpolated and used for compositing ink effects. The interpolated ink space coordinates can be used in combination with imported textures, procedurally generated textures, animations, or timing data to composite the ink stroke.

Figure 3C:
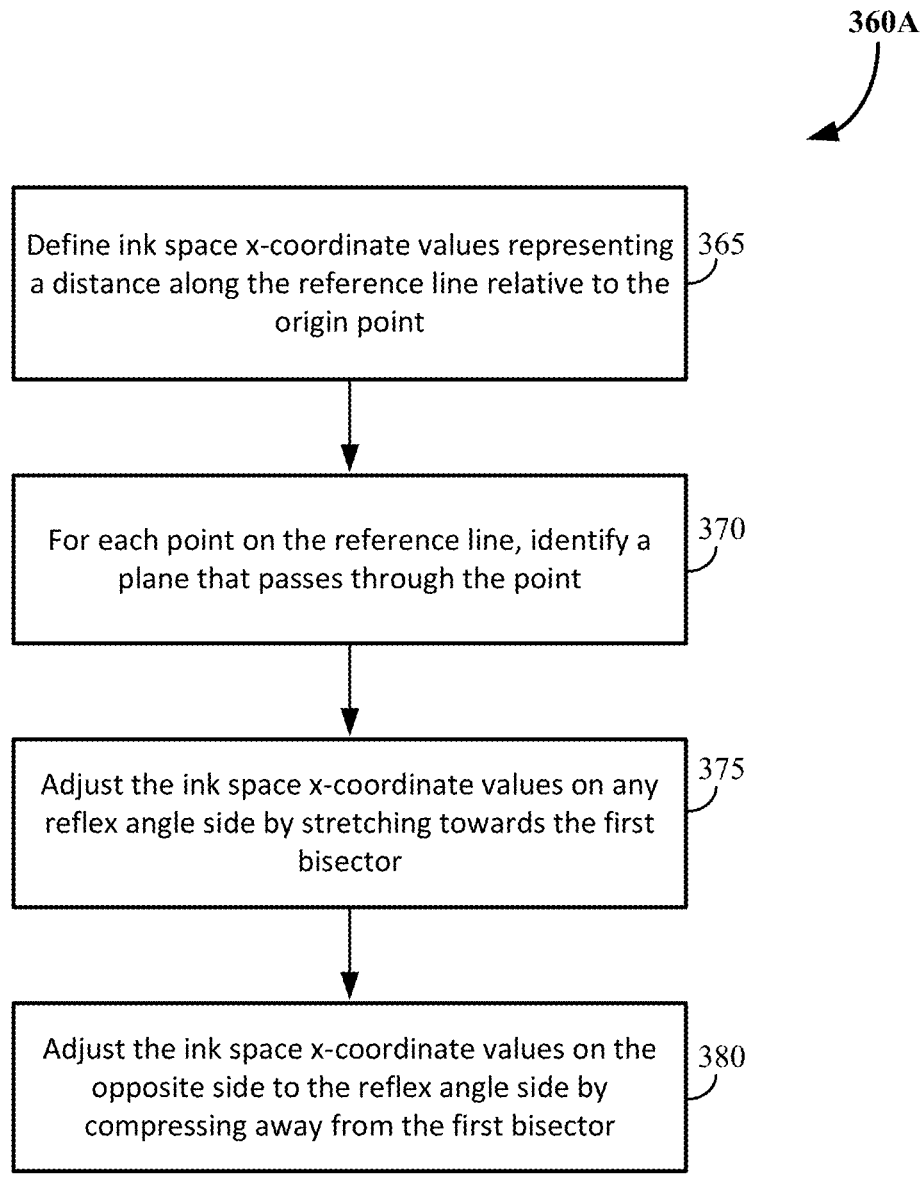
Figure 3D:
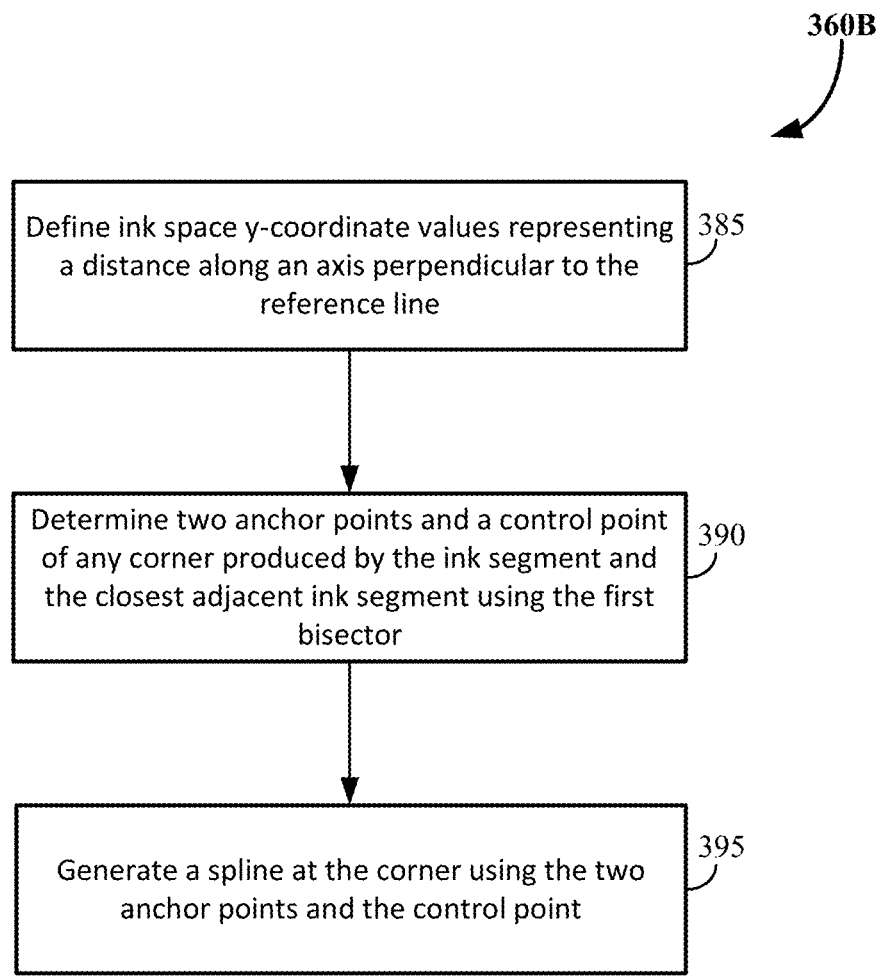

FIG. 3B illustrates an example process flow diagram for defining an ink space coordinate system. Process 310A of FIG. 3B includes operations 320, 325, 330, 335, 340, 345, 350, and 355, which calculate an angle of curvature. Together, operations 350 and 355 can be considered generating ink space coordinates, as represented by process 360. FIGS. 3C and 3D show one example of process 360 carried out as processes 360A and 360B.

Figure 4A:
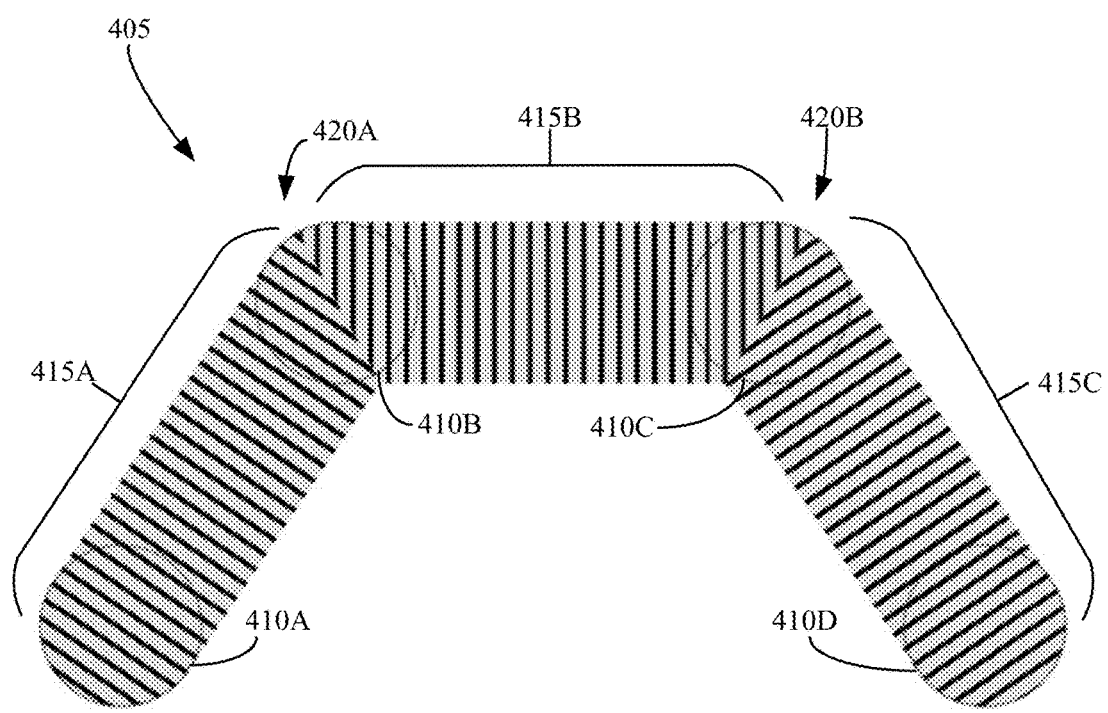
FIGS. 4A, 4B, and 4C illustrate example processes of warping ink space x-coordinates of an ink space coordinate system.
Figure 4B:
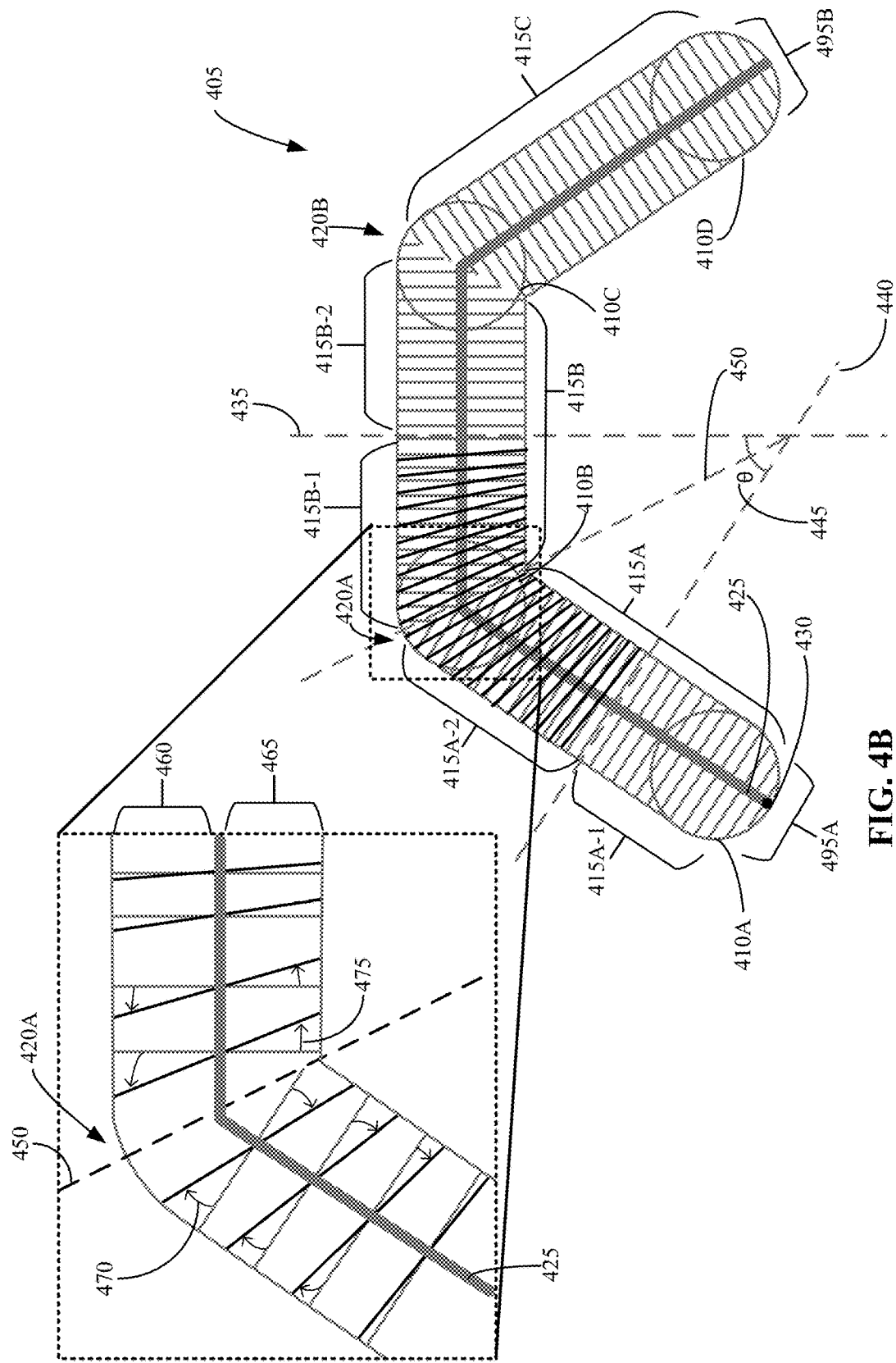
Figure 5A:
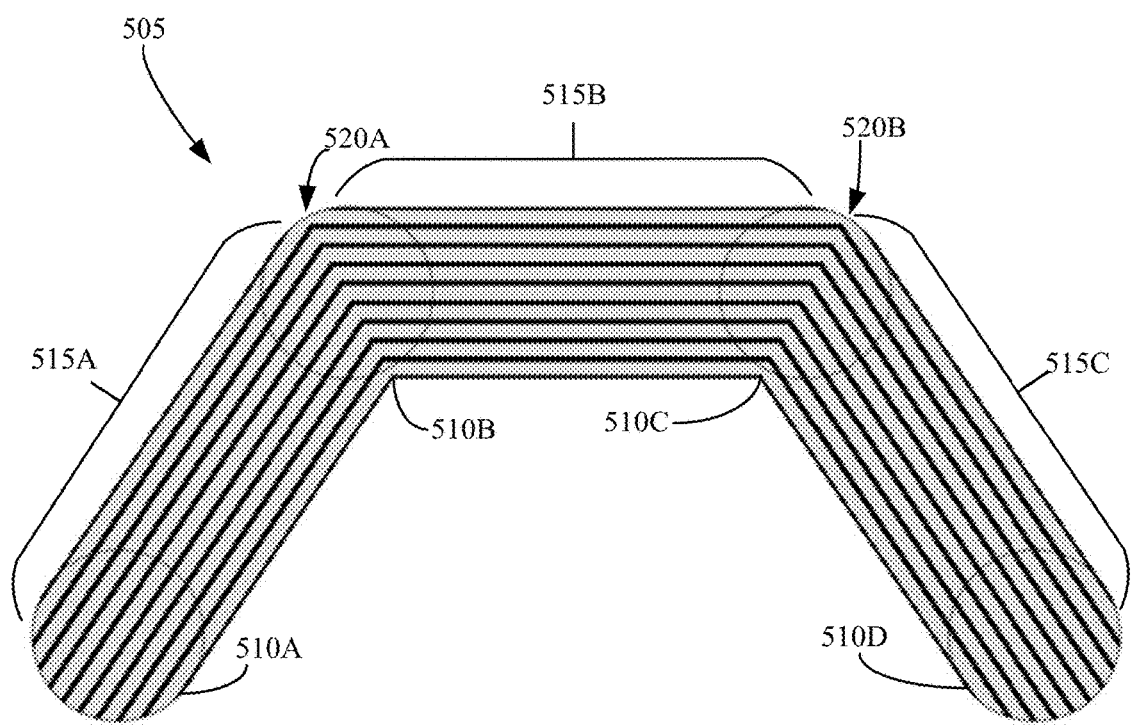
FIGS. 5A, 5B, and 5C illustrate example processes of warping ink space y-coordinates of an ink space coordinate system.
Figure 5B:
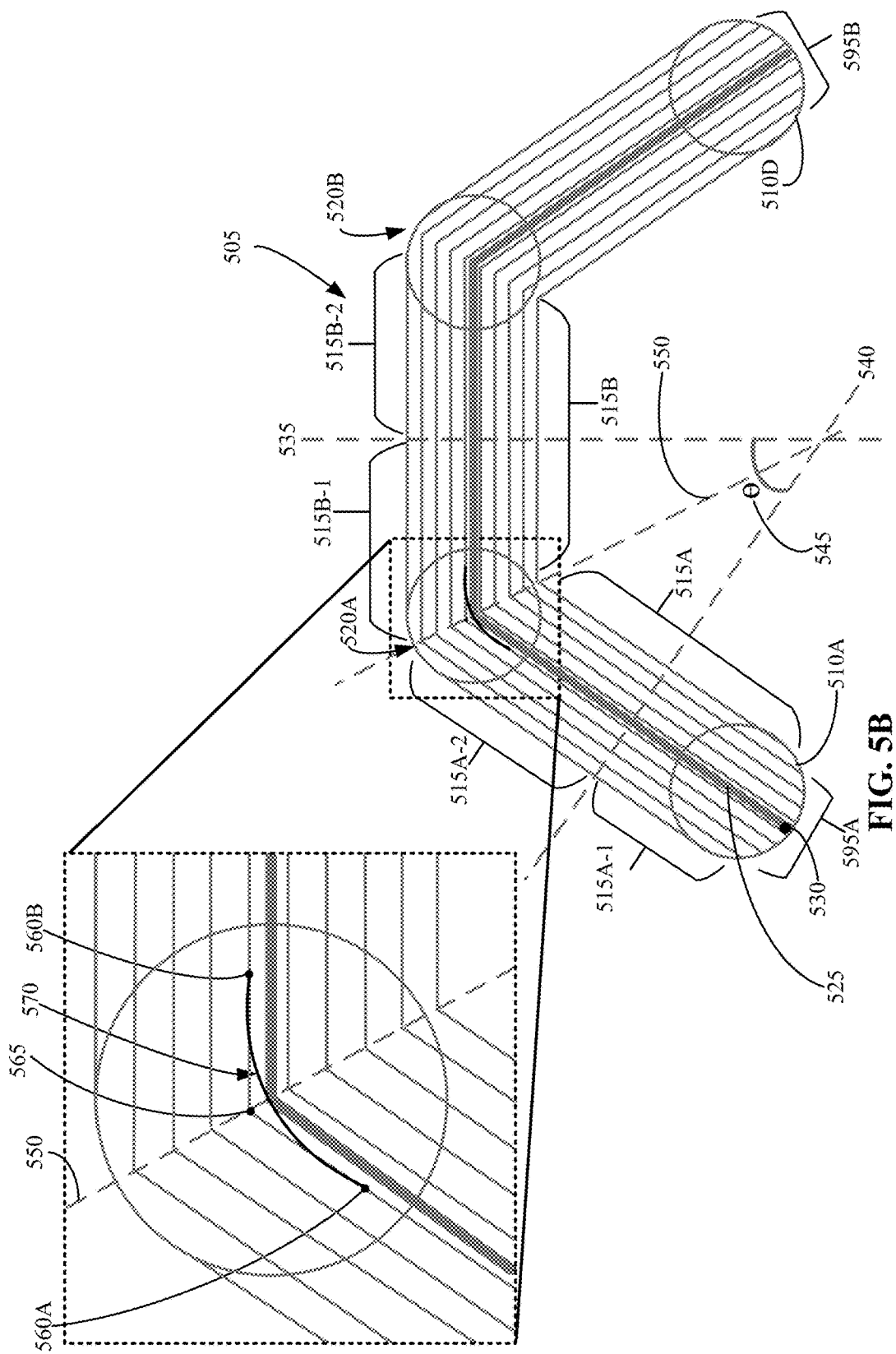

Process 310A begins with the digital ink system assigning (320) a reference line (e.g., reference line 425 of FIG. 4B and reference line 525 of FIG. 5B) of the ink stroke (e.g., ink stroke 405 of FIG. 4B and ink stroke 505 of FIG. 5B). The reference line can be assigned along the length of the ink stroke and can extend through the final ink points (e.g., ink point 410A and ink point 410D of FIG. 4B and ink point 510A and ink point 510D of FIG. 5B) to the end caps (e.g., end cap 495A and end cap 495B of FIG. 4B and end cap 595A and end cap 595B of FIG. 5B) of the ink stroke. The reference line can become the x-axis of the ink space coordinate system.

In some cases, the reference line may be a function of the ink points. For example, the ink points may be offset because of pen tilt causing the reference line to be off center.

Two angles can be defined at the reference line (e.g., a top angle and a bottom angle, relative to the reference line) where two adjacent ink segments meet, also referred to as an intersection (e.g., intersection 420A and intersection 420B of FIG. 4B and intersection 520A and intersection 520B of FIG. 5B). In some cases, the adjacent ink segments are in a perfectly straight line. In this case, there is no difference in the angles produced at the intersection of the adjacent ink segments. The angle on the top and the angle on the bottom are 180° angles ("straight angles").

In other cases, such as shown in FIGS. 4B and 5B, the adjacent ink segments are not in a perfectly straight line. In this case, there is a corner produced by the adjacent ink segments (e.g., the corner produced by intersection 420A in FIG. 4B). One side of the ink stroke has an angle in the corner greater than 180° and is referred to herein as the reflex angle side (e.g., reflex angle side 460 of FIG. 4B). The opposite side of the ink stroke has an angle in the corner that is less than 180° and is referred to herein as the opposite side to the reflex angle side (e.g., opposite side 465 of FIG. 4B).

The digital ink system can assign (325) an origin point (e.g., origin point 430 in FIG. 4B and origin point 530 in FIG. 5B) for the ink stroke on the reference line. The origin point can define where the coordinate (0,0) is in the ink space coordinate system.

The digital ink system can divide (330), using a first dividing line (e.g., first dividing line 435 of FIG. 4B and first dividing line 535 of FIG. 5B), an ink segment of the ink stroke into a first half and a second half (e.g., first half 415B-1 and second half 415B-2 of FIG. 4B and first half 515B-1 and second half 515B-2 of FIG. 5B). A closest adjacent ink segment (e.g., ink segment 415A of FIG. 4B and ink segment 515A of FIG. 5B) of the ink stroke can also be divided (335), using a second dividing line (e.g., second dividing line 440 of FIG. 4B and second dividing line 540 of FIG. 5B), into a first half and a second half (e.g., first half 415A-1 and second half 415A-2 of FIG. 4B and first half 515A-1 and second half 515A-2 of FIG. 5B). The first dividing line and the second dividing line are perpendicular to the reference line. In some cases, the closest adjacent ink segment may be the closest adjacent ink segment to the first half of the ink segment.

It should be understood when reference is being made to an object being perpendicular to another object, there may be non-idealities, and tolerances with an acceptable range may be accepted within the constraints of the technology.

Once the ink segment and the closest adjacent ink segment are divided using the first dividing line and the second dividing line, a first angle (e.g., first angle 445 of FIG. 4B and first angle 545 of FIG. 5B) between the first dividing line and the second dividing line can then be determined (340). A first bisector (e.g., first bisector 450 of FIG. 4B and first bisector 550 of FIG. 5B) of the first angle can then be determined (345). Use of the first bisector will be discussed in more detail with the description of FIGS. 3C and 3D and FIGS. 4B and 5B.

In some cases, the first dividing line and the second dividing line are not used to calculate the first angle. Instead, any line perpendicular to the reference line may be used.

Process 310A can continue with the operations that can be carried out as part of process 360. As previously described, process 360 generates ink space coordinates for the ink space coordinate system.

As process 360 starts, ink space coordinates for the ink space coordinate system are created (350). The ink space coordinates can include ink space x-coordinates representing a distance along the reference line relative to the origin point and ink space y-coordinates representing a distance along an axis perpendicular to the reference line (see FIG. 2A).

Once the ink space coordinates are created (350), the digital inking system can perform a warping (355) to create curvature in the ink space coordinate system.

If the angle produced at the intersection of the ink segment and the closest adjacent ink segment is a straight angle, no warping is performed. If the angle produced at the intersection of the ink segment and the closest adjacent ink segment is not a straight angle, the warping is performed.

Performing the warping can include warping the ink space x-coordinate values to follow the curvature of the ink stroke by stretching the ink space x-coordinate values on the reflex angle side and compressing the ink space x-coordinate values on the opposite side to the reflex angle side. Performing the warping can also include warping the ink space coordinate y-values to smooth the transitions between adjacent ink segments of the ink stroke.

The ink space x-coordinate values can have zeroth order discontinuities (e.g., jumps) at the junctions because the ink space x-coordinate values are based on the position along the reference line. On the reflex angle side of the ink stroke, there can be ink space x-coordinate values that fall outside of where the reference line begins or ends. On the opposite side to the reflex angle side, the ink segments can overlap, so some ink space x-coordinate values are missing.

The ink space y-coordinate values can have zeroth order continuity because the reference line has zeroth order continuity, but warping the ink space coordinate system provides first order continuity (e.g., removes any cusps).

As previously described, if no warping is performed at a portion of the ink stroke that has a curve, the ink space coordinate system can result in a space with discontinuities when the stroke is curving, e.g., non-adjacent points in the ink space coordinate system would appear adjacent on-screen, and some points in ink space coordinate system would appear nowhere on screen.

The warping is a function the angle of the corner produced by the ink segment and the closest adjacent ink segment, as well as a function of the length of the closest adjacent ink segment. In the case of the warping of the ink space y-coordinate value, the warping can be a function of the length of the closest adjacent ink segment and the radius of the nib shape used.

Figure 4C:
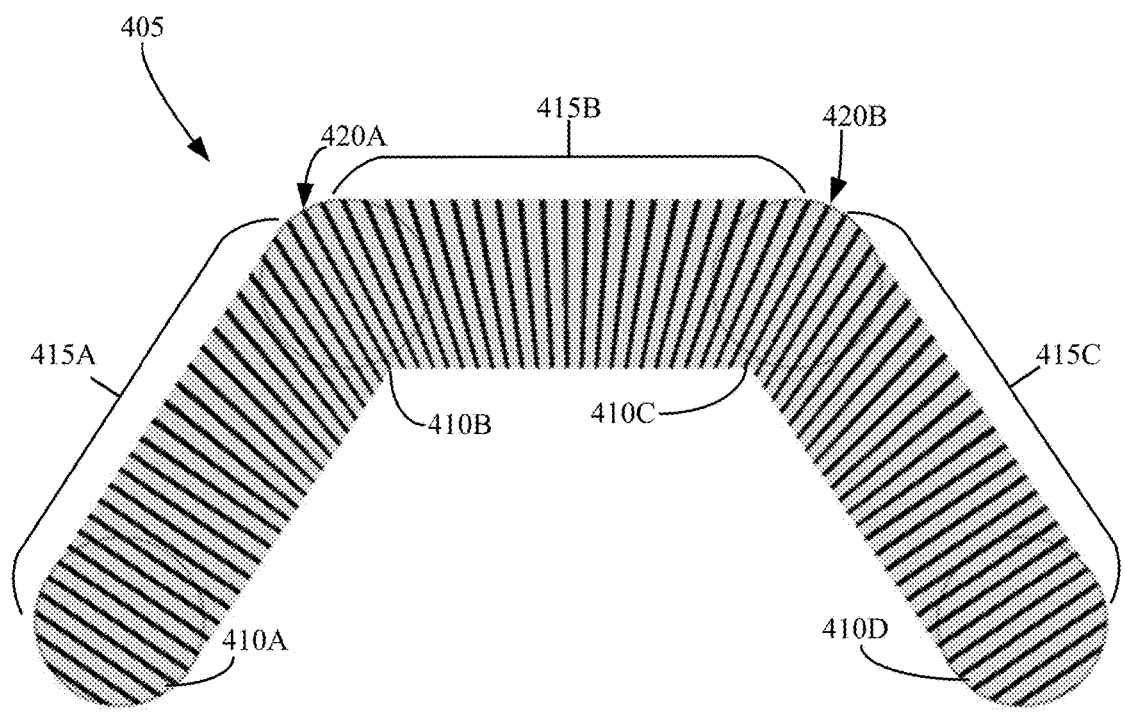

FIG. 3C illustrates an example process flow diagram for generating ink space x-coordinates of an ink space coordinate system; FIG. 4A illustrates an example representation of an ink stroke having ink space x-coordinates of an ink space coordinate system prior to performing a warping; FIG. 4B illustrates an example representation of warping ink space x-coordinates of an ink space coordinate system; and FIG. 4C illustrates an example representation of an ink stroke having ink space x-coordinates of an ink space coordinate system after performing a warping.

An ink stroke 405 is shown with four ink points 410 (e.g., ink point 410A, ink point 410B, ink point 410C, and ink point 410D) and three ink segments 415 (ink segment 415A, ink segment 415B, and ink segment 415C).

Referring to FIG. 3C and FIG. 4A, as process 360A starts, ink space x-coordinate values are defined (365). As previously described, ink space x-coordinate values represent a distance along the reference line relative to the origin point. The lines shown in FIGS. 4A-4C show a representation of the ink space x-coordinate values, which extend from the ink space x-coordinate value located on the reference line. It should be understood that FIGS. 4A-4C are visual aids to show how the ink space coordinate system behaves.

Ink space x-coordinates of an ink space coordinate system are shown in FIG. 4A for the ink stroke 405 before any warping is performed. In the ink stroke 405, two corners are produced at intersections 420 of adjacent ink segments. The first corner is produced at intersection 420A, where ink segment 415A and ink segment 415B meet. The second corner is produced at intersection 420B, where ink segment 415B and ink segment 415C meet.

As can be seen in the example of FIG. 4A, in some cases, without any warping, ink space x-coordinates in ink segment 415A and ink space x-coordinates in ink segment 415B form a cusp at the first corner produced at the intersection 420A; and ink space x-coordinates in ink segment 415B and ink space x-coordinates in ink segment 415C form a cusp at the second corner produced at intersection 420B. When reference to ink space x-coordinates not along the reference line, the intersection may form a "jump" (as can be seen in FIG. 4B).

Referring to FIGS. 3C and 4B, once the ink space x-coordinate values are defined (365), if the angle produced at the intersection of the ink segment and the closest adjacent ink segment is a straight angle, no warping is performed. Alternatively, if the angle produced at the intersection of the ink segment and the closest adjacent ink segment is not a straight angle, the warping is performed.

The elements used for warping ink space x-coordinates of an ink space coordinate system can include a reference line 425, an origin point 430, a first dividing line 435, a second dividing line 440, a first angle 445, and a first bisector 450. As previously described, the reference line 425 of the ink stroke 405 is assigned. Then, the origin point 430 can be assigned on the reference line 425. The origin point 430 can be the (0,0) coordinate for the ink space coordinate system.

The first dividing line 435 can divide ink segment 415B into a first half 415B-1 and a second half 415B-2. The closest adjacent ink segment to the first half 415B-1 of ink segment 415B is ink segment 415A and the closest adjacent ink segment to the second half 415B-2 of ink segment 415B is ink segment 415C.

In the example of FIG. 4B, the closest adjacent ink segment to the first half 415B-1 of ink segment 415B (e.g., ink segment 415A) is divided into a first half 415A-1 and a second half 415A-2 using the second dividing line 440.

The first angle 445 between the first dividing line 435 and the second dividing line 440, as well as the first bisector 450 of the first angle 445, can then be determined.

If a warping is to be performed, the ink space x-coordinate values are warped relative to the origin point 530 for the first half 415B-1 of the ink segment 415B and the second half 415A-2 of the closest adjacent ink segment 415A using a bisector, such as the first bisector 550 described in process 310A of FIG. 3B.

Returning to FIG. 3C, if a warping is performed, process 360A continues with identifying (370), for each point on the reference line, a plane that passes through the point. Then, the ink space x-coordinate values of points on the plane based on the first bisector.

To adjust the ink space x-coordinate values, the ink space x-coordinate values on the plane that are on the reflex angle side are stretched (375) towards the first bisector and the ink space x-coordinate values on the plane that are on the opposite side to the reflex angle side are compressed (380) away from the first bisector. This warping removes the cusps and jumps by unifying x-coordinate values near the first bisector. In the example of FIG. 4B, a portion of the ink stroke 405, including the corner produced at intersection 420A is magnified to show the stretching and compressing of the ink space x-coordinate values. The ink stroke 405 at the corner produced at intersection 420A has two sides, a reflex angle side 460 and an opposite side 465 to the reflex angle side. The reflex angle side 460 is the side of the ink stroke 405 above the reference line 425 and the opposite side 465 to the reflex angle is the side of the ink stroke 405 that is below the reference line 425.

As can be seen, the ink space x-coordinate values on the reflex angle side 460 are stretched towards (470) the first bisector 450 and the ink space x-coordinate values on the opposite side to the reflex angle side 465 are compressed away from (475) the first bisector 440.

Referring to FIG. 4C, ink space x-coordinates of an ink space coordinate system are shown for the ink stroke 405 after warping is performed. In some cases, after warping is preformed, none of the ink space x-coordinates in the ink stroke 405 overlap each other at the corners produced at the intersections 420. The stretching and compressing of the ink space x-coordinate values can make the ink stroke 405 and any ink effect applied to the ink stroke 405 appear more realistic.

Figure 5C:
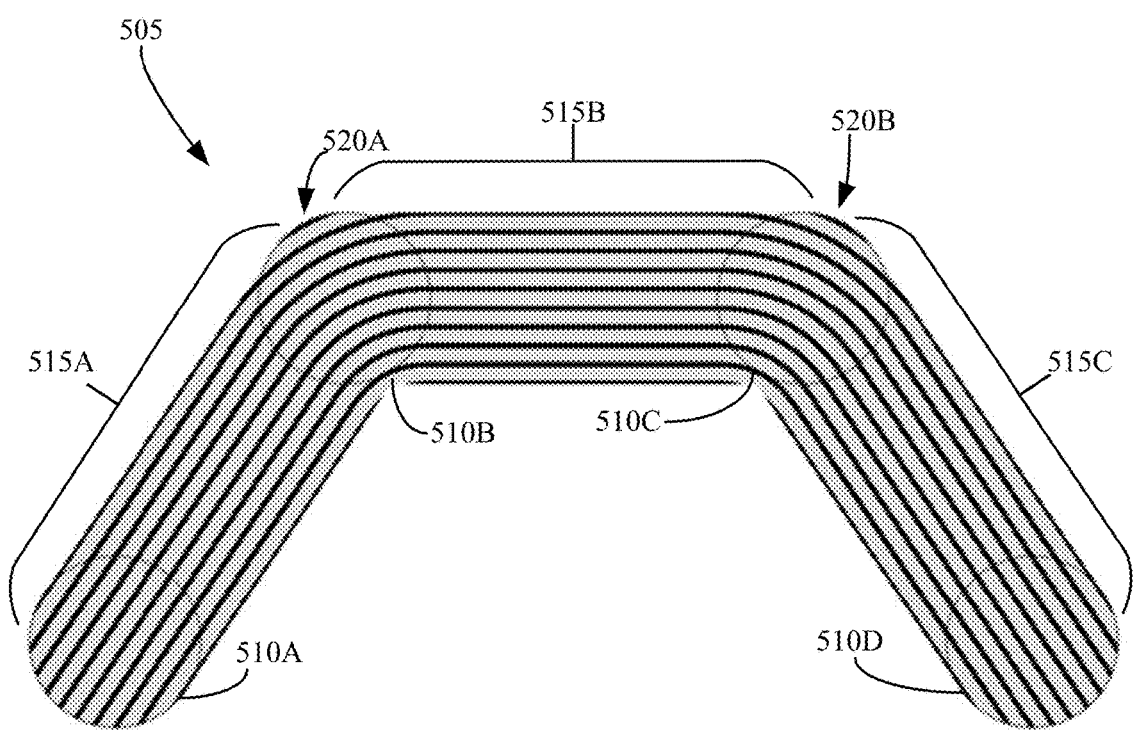

FIG. 3D illustrates an example process flow diagram for generating ink space y-coordinates of an ink space coordinate system; FIG. 5A illustrates an example representation of an ink stroke having ink space y-coordinates of an ink space coordinate system prior to performing a warping; FIG. 5B illustrates an example representation of warping ink space y-coordinates of an ink space coordinate system; and FIG. 5C illustrates an example representation of an ink stroke having ink space y-coordinates of an ink space coordinate system after performing a warping.

An ink stroke 505 is shown that includes four ink points 510 (e.g., ink point 510A, ink point 510B, ink point 510C, and ink point 510D) and three ink segments 515 (ink segment 515A, ink segment 515B, and ink segment 515C).

Referring to FIGS. 3D and 5A, as process 360B starts, ink space y-coordinate values are defined (385). As previously described, ink space y-coordinate values represent a distance along an axis perpendicular to the reference line. The lines shown in FIGS. 5A-5C show a representation of the ink space y-coordinate values. It should be understood that FIGS. 5A-5C are visual aids to show how the ink space coordinate system behaves.

Ink space y-coordinates of an ink space coordinate system are shown in FIG. 5A for the ink stroke 505 before any warping is performed. In the ink stroke 505, two corners are produced at intersections 520. The first corner is produced at intersection 520A, where ink segment 515A and ink segment 515B meet. The second corner is produced at intersection 520B, where ink segment 515B and ink segment 515C meet.

In some cases, without any warping, the transitions between the intersections of adjacent segments at the corners can be sharp and first-order discontinuous.

Referring to FIGS. 3D and 5B, once the ink space y-coordinate values are defined (385), if the angle produced at the intersection of the ink segment and the closest adjacent ink segment is a straight angle, no warping is performed. If the angle produced at the intersection of the ink segment and the closest adjacent ink segment is not a straight angle, the warping is performed.

As shown in FIG. 5B, the elements used to warp ink space y-coordinates of an ink space coordinate system on ink stroke 505 can include a reference line 525, an origin point 530, a first dividing line 535, a second dividing line 540, a first angle 545, and a first bisector 550. As previously described, the reference line 525 of the ink stroke 505 is assigned. Then, the origin point 530 can be assigned on the reference line 525. The origin point 530 can be the (0,0) coordinate for the ink space coordinate system.

The first dividing line 535 can divide ink segment 515B into a first half and a second half. The closest adjacent ink segment to the first half of the ink segment 515B is ink segment 515A and the closest adjacent ink segment to the second half of ink segment 515B is ink segment 515C. In the example of FIG. 5B, ink segment 515A is divided into a first half and a second half using the second dividing line 540. The first angle 545 between the first dividing line 535 and the second dividing line 540, as well as the first bisector 550 of the first angle 545, can then be determined. Returning to FIG. 3D, if a warping is to be performed, process 360B continues with determining (390) two anchor points and a control point of the corner produced by the ink segment and the closest adjacent ink segment using the first bisector. A spline can then be generated (395) at the corner using the two anchor points and the control point determined in operation 390.

The reference line may be modified when the spline is generated. The ink space y-coordinate values can be calculated as the closest distance to the warped reference line (e.g., the distance along the axis perpendicular to the reference line), which can yield the warped ink space y-coordinate values.

In the example of FIG. 5B, a portion of the ink stroke 505, including the corner produced at intersection 520A is magnified to show the two anchor points, control point, and spline used to warp the ink space y-coordinate values.

The two anchor points (e.g., anchor point 560A and anchor point 560B) and the control point (e.g., control point 565) of the corner produced at intersection 520A are determined using the first bisector 550. The spline (e.g., spline 570) can be generated at the first corner produced at intersection 520A using the two anchor points (e.g., anchor point 560A and anchor point 560B) and the control point (e.g., control point 565).

In an example, the warping of the ink space y-coordinates (e.g., the distance from the reference line 525), can be achieved by using Bezier splines to create arcs between the reference lines of two adjacent ink segments. In some cases, the control point can be the junction of an un-warped ink space coordinate value representing the distance along the axis perpendicular of the ink segment 515B and the adjacent ink segment (e.g., ink segment 515A).

Referring to FIG. 5C, ink space y-coordinates of an ink space coordinate system are shown for the ink stroke 505 after warping is performed. Warping is performed for the ink space y-coordinate values to smooth transitions between adjacent ink segments in the ink stroke 505.

As can be seen, the ink space y-coordinates are warped to follow the curvature of the stroke. The amount of warping can be determined using the angles between the current ink segment and the adjacent ink segments. The ink segment is divided in half, and each half of the ink segment computes the angle between the dividing line of itself and the dividing line of its closest adjacent ink segment. The bisector of this angle is used to stretch and compress the values on the corners produced by the current ink segment and the closest adjacent ink segment, respectively.

As can also be seen, on the ends of the stroke, for the ink space y-coordinate values, the bisector can be the perpendicular to the reference line of the ink segment. When the bisector is the perpendicular, it produces the same result as two adjacent segments that are collinear (e.g., no curve in the ink stroke at the intersection of the ink stroke and the adjacent ink stroke), thus resulting in no warping of the ink space y-coordinate value.

As an example, the ink space y-coordinate can be warped to smooth the transitions between segments to produce a curving transition as opposed to a sharp cusp. Splines can be used at corners produced by adjacent ink segments to smooth the transitions of reference line distances between adjacent ink segments. Using the angle bisector of the angle between two adjacent ink segments, two anchor points and a control point are determined and used, for example, to create a Quadratic Bézier curve between the reference line distances of two adjacent segments. This technique can allow the smoothing the transitions between ink segments while maintaining first-order continuity.

In some cases, on the ends of the stroke, for the ink space y-coordinate value, the ink stroke is treated as a collinear or intersection with a straight angle, and no warping is performed. Since there is some additional stroke geometry that goes beyond the end ink points of the ink stroke, the distance from the reference line to the end ink points can be clamped to produce a rounded endcap (or other shape).

It should be understood that other techniques can be included to handle very sharp corners and other edge cases.

Figure 6:
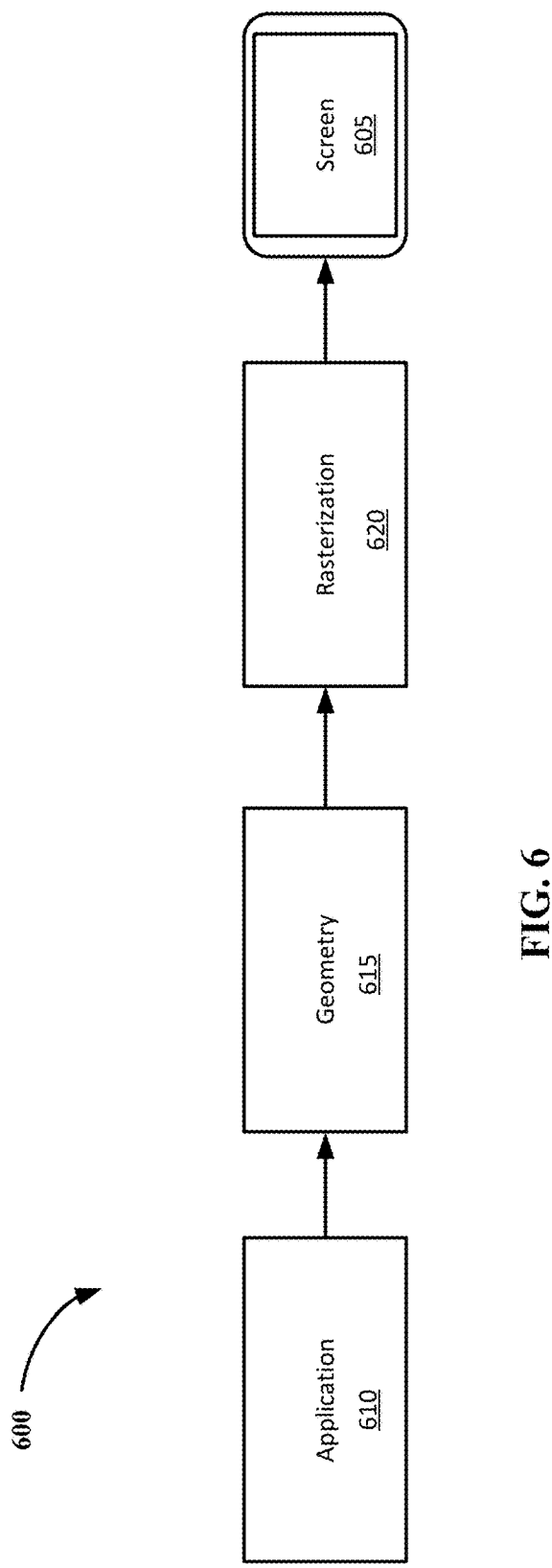
FIG. 6 illustrates an example graphics pipeline.

FIG. 6 illustrates an example graphics pipeline. Referring to FIG. 6, a graphics pipeline 600 is shown. The graphics pipeline 600 includes the steps a graphics system needs to perform to render content to a 2D screen (e.g., screen 605). The graphics pipeline 600 can be divided into three main parts, including application 610, geometry 615, and rasterization 620.

Figure 7:
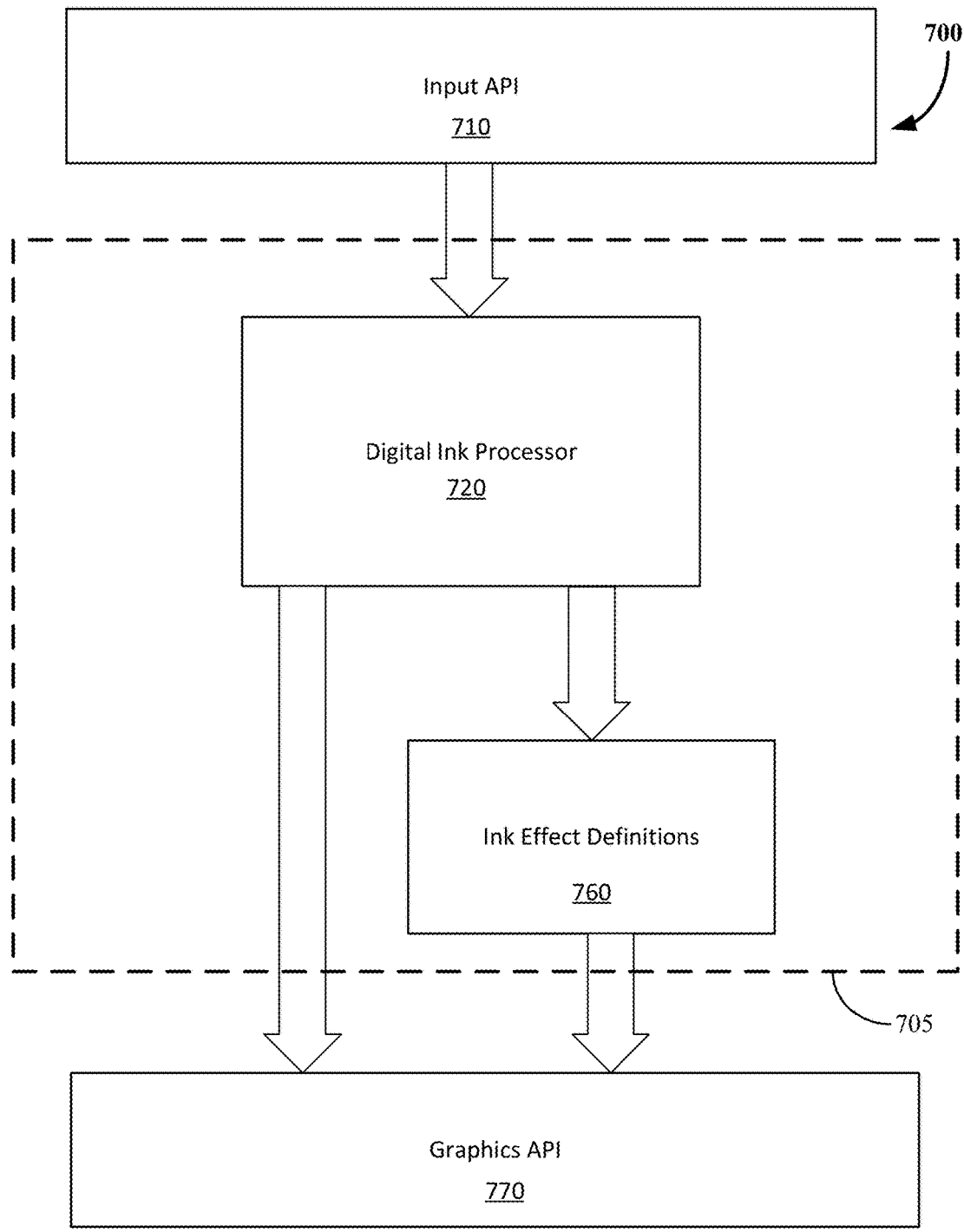
FIG. 7 illustrates a block diagram of a system enabled to accept ink inputs and apply effects to the ink objects in a digital ink system.

FIG. 7 illustrates a block diagram of a system 700 enabled to accept ink inputs and apply effects to the ink objects in a digital ink system, represented by dashed line 705. In one or more embodiments, the digital ink system 705 is implemented as an application (or a program of the operating system) that provides digital ink support to other applications (or programs of the operating system). The digital ink system 705 optionally includes an application programming interface (API) allowing the applications or other programs to interact with the functionality provided by the digital ink system 705. Alternatively, the digital ink system 705 can be implemented in an application and provide digital ink support for that application but not for other applications. Alternatively, the digital ink system 705 can be implemented as a combination thereof. For example, some functionality of the digital ink system 705 can be implemented in an application (or a program of the operating system) that provides digital ink support to other applications or programs, and other functionality of the digital ink system 705 can be implemented in the individual applications to which the digital ink system 705 provides support.

The digital ink system 705 processes the inputs received from the input application program interface (API) 710 (i.e., pointer inputs), and passes them for rendering to the graphics API 770, which in turn will pass the graphics of the digital ink system 705 (including ink objects) to an output device, such as, for example, a computer monitor or smartphone display. For example, the ink points can be sent to a rendering layer of the digital ink system 705, which then calls a graphics card driver API.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API implementing component. The API is generally a set of programming instructions and standards for enabling two or more applications to communicate with each other.

Figure 9:
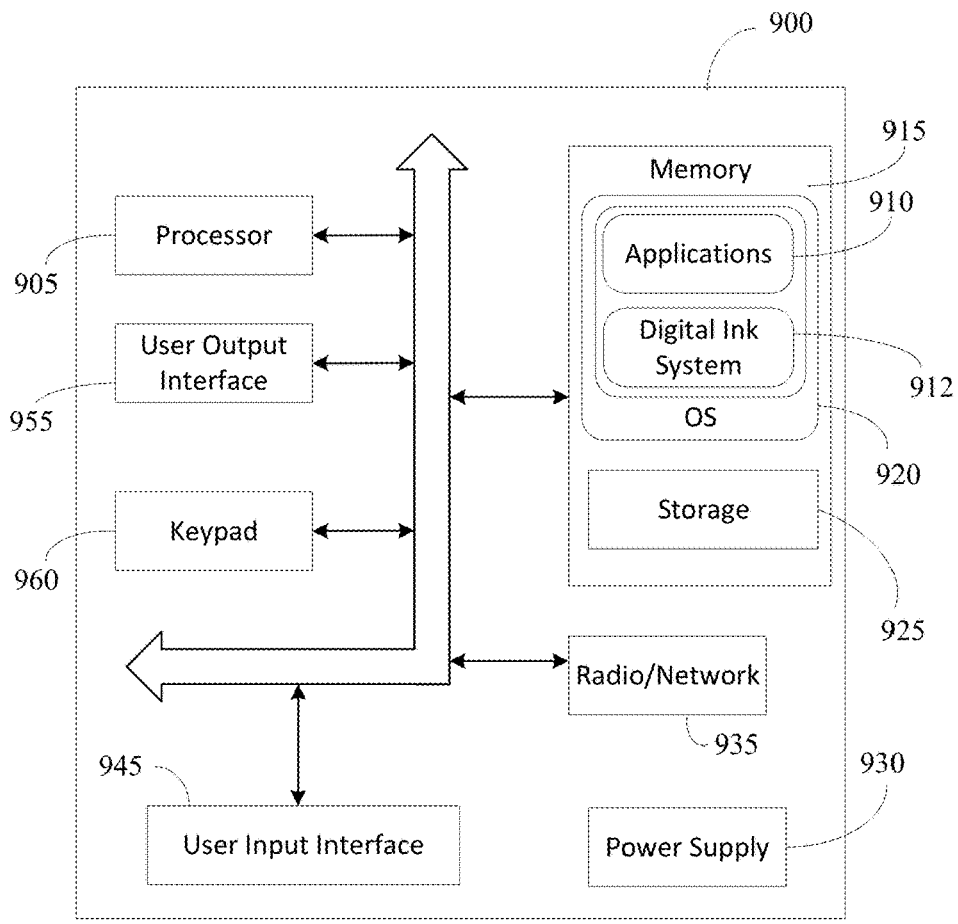
FIG. 9 shows a block diagram illustrating components of a computing device used in some embodiments.

The system 700 can be part of a computing device such as described with respect to FIG. 9, and may receive pointer inputs from input devices such as mice, keyboards, remote controls, and the like, or from natural user input (NUI) methods including those relying on speech recognition, touch and stylus recognition, gesture recognition both on screen and adjacent to the screen, air gestures, head and eye tracking, voice and speech, vision, touch, hover, gestures, and machine intelligence. Pointer inputs are those inputs that define a user's point of interaction within a graphical user interface, such as by a cursor represented within a given program or application and associated with a given input device. Inputs may be interpreted by the input API 710 for use in the digital ink system 705 as digital ink input. A user may signal to the system 700 that ink input is desired, as opposed to other styles of input, by selecting an ink input user interface (UI) element, using a particular input device, or contextually based on a position of a pointer in the digital ink system 705. For example, a user may use an ink input stylus on a touch screen to indicate that inking input is desired (as opposed to positional input via a mouse device), inking input may be enabled in a canvas area of a content creation application, or inking input may be enabled when a user actuates a mouse button (as opposed to positional input when the mouse button is unactuated). When the user has indicated that ink input is desired, the input API 710 receives the inputs from the input devices, and transmits coordinates and pressures (if available on a touch-based device) and other metadata to the digital ink system 705. The other metadata may include, but is not limited to: a device identifier (e.g., stylus one, stylus two), primary or secondary input (e.g., mouse button one or two, stylus nib or "eraser"), velocity of input, authoring mode of when input is received (e.g., editing mode, presentation mode, textbox input, freeform input), user-defined settings within the digital ink system 705, etc.

Input from the input API 710 is received by an ink stroke processor 720, which can interface with the graphics pipeline described with respect to FIG. 6. The ink stroke processor 720 can perform processes 300, 310A, 360A, and 360B. Ink stroke data can be passed to an application and through the graphics pipeline to a graphics API 770, for example, after creating geometries to be associated with the ink stroke based on drawing parameters. The drawing parameters may also indicate an ink effect to apply to the stroke or options for the ink effect. The ink stroke processor 720 uses these inputs to create the geometry of the stroke as it will be seen in the GUI. These geometries are passed to the graphics API 770 and may include an ink effect definition 760, when an ink effect has been selected by a user, so that the user can see the ink effect applied to the stroke while the user makes that stroke in the GUI, for example, seeing the "ink" flowing from a stylus into the GUI or rainbow ink effect such as shown in FIGS. 1A, 1B, 1C, and 1D.

The application can receive the ink stroke data, and the ink stroke data can be stored within the document's framework, for example, as an object in an extensible markup language (XML) hierarchy or a JavaScript Object Notation (JSON) representation.

The ink effect definitions 760 define additional graphical effects that are applied to the geometries of the strokes shown in the GUI. These effects may be shown in various layers and various behaviors that are set by the user. The definitions include image files (e.g., bitmap, GIF (graphics interchange format), JPEG (joint photographic experts group), PNG (portable network graphic)) as well as color gradient (defining various colors to use in series with a stroke). In some aspects, animated images, such as animated GIFs, may be used as the image files for ink effect definitions 760 so that an animated effect. such as, for example, a flash, sparkle, wave, fade, pulse, etc., may be applied to the ink object.

The graphics API 770 handles the geometries and rendered graphical effects so that they will be displayed according to the display devices associated with the system 700. The geometries and ink effect definitions 760 are converted to pixel values appropriate for the user's display device and any overlay effects are provided. For example, for a given geometry and ink effect definition, the graphics API 770 may render the ink object according to a first way (having x pixels with various hues and luminosities) when the ink object is displayed on a first display device but render the ink object according to a second way (having y pixels with various hues and luminosities) on a second display device, such as, for example, when a user views a presentation on a laptop monitor and switches display to a projector with a different resolution and color properties.

Figure 8:
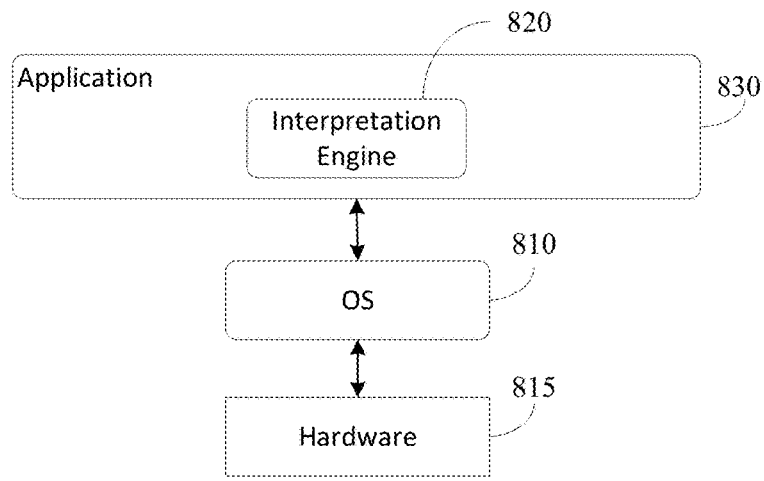
FIG. 8 shows a block diagram illustrating architecture for a computing device used in some embodiments.

An illustrative architecture for a user computing device is provided with reference to FIGS. 8 and 9.

Referring to FIG. 8, the architecture for the user computing device can include a device operating system (OS) 810. The device OS 810 manages user input functions, output functions, storage access functions, network communication functions, and other functions for the device. The device OS 810 may be directly associated with the physical resources of the device or running as part of a virtual machine backed by underlying physical resources. According to many implementations, the device OS 810 includes functionality for recognizing user gestures and other user input via the underlying hardware 815.

An interpretation engine 820 of an application 830 running on the device OS 810 listens (e.g., via interrupt, polling, and the like) for user input event messages from the device OS 810. The UI event messages can indicate a panning gesture, flicking gesture, dragging gesture, or other gesture on a touchscreen of the device, a tap on the touch screen, digital ink input, keystroke input, or other user input (e.g., voice commands, directional buttons, trackball input). The interpretation engine 820 translates the UI event messages into messages understandable by the application.

FIG. 9 shows a block diagram illustrating components of a computing device used in some embodiments. Referring to FIG. 9, system 900 represents a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 900 may be incorporated to implement a particular computing device.

System 900 includes one or more processors 905 that processes data according to instructions of one or more application programs 910, and/or operating system 920. Examples of processors 905 include general purpose central processing units (CPUs), graphics processing units (GPUs), application specific processors, and logic devices, as well as any other type of processing device, combinations, or variations thereof. Processor 905 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor), network connectivity components (e.g., including Radio/network interface 935), and user input interface 945 components.

The one or more application programs 910, including digital ink system 912 may be loaded into memory 915 and run on or in association with the operating system 920. In some cases, digital ink system 912 may be included as part of the one or more application programs 910. Device operating systems generally control and coordinate the functions of the various components in the computing device, providing an easier way for applications to connect with lower level interfaces like the networking interface 935 and some components of user input interface 945 or user output interface 955. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 9, can be thought of as additional, nested groupings within the operating system space, each containing an OS, application programs, and APIs.

Memory 915 may comprise any computer readable storage media readable by the processor 905 and capable of storing software 910 the application 910, OS 920, and digital ink system 912.

Memory 915 may include volatile and nonvolatile memory (such as storage 925), removable and non-removable media implemented in any method or technology for storage of information, such as computer readable instructions, data structures, program modules, or other data. Examples of storage media of memory 915 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory, propagated signal.

Memory 915 may be implemented as a single storage device but may also be implemented across multiple storage devices or sub-systems co-located or distributed relative to each other. Memory 915 may include additional elements, such as a controller, capable of communicating with processor 905. Memory 915 may include multiple buffers.

System 900 has a power supply 930, which may be implemented as one or more batteries and/or an energy harvester (ambient-radiation, photovoltaic, piezoelectric, thermoelectric, electrostatic, and the like). Power supply 930 may further include an external power source, such as an AC adapter or a powered docking cradle that supplements or recharges the batteries.

System 900 may also include a radio/network interface 935 that performs the function of transmitting and receiving radio frequency communications. The radio/network interface 935 facilitates wireless connectivity between system 900 and the "outside world," via a communications carrier or service provider. Transmissions to and from the radio/network interface 935 are conducted under control of the operating system 920, which disseminates communications received by the radio/network interface 935 to application programs 910 and vice versa.

The radio/network interface 935 allows system 900 to communicate with other computing devices, including server computing devices and other client devices, over a network.

The system can further include a user interface system with user input interface 945 and user output interface 955, which may include input/output (I/O) devices and components that enable communication between a user and the system 900. User input interface 945 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input. For inclusion of the inking, the user input interface 945 at least includes a touch-based user input interface or a digitizing pen used in place of or as part of the touch-based user input interface. A touch-based user input interface can include a touchscreen and/or surface with sensing components for a digitizer.

The user output interface 955 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

Visual output may be depicted on the display in myriad ways, presenting graphical user interface elements, text, images, video, notifications, virtual buttons, virtual keyboards, or any other type of information capable of being depicted in visual form.

The user interface system may also include user interface software and associated software (e.g., for graphics chips and input devices) executed by the OS 920 in support of the various user input and output devices. The associated software assists the OS 920 in communicating user interface hardware events to application programs using defined mechanisms. The user interface system including user interface software may support a graphical user interface, a natural user interface, or any other type of user interface. Certain aspects of the described digital ink system 912 and the processes 300, 310A, 360A, and 360B may include or interface with the user interface software.

Embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims subject to any explicit definitions and disclaimers regarding terminology as provided above.

What is claimed is:

1. A method for managing visual layouts of ink strokes, comprising:

receiving ink stroke data of an ink stroke, wherein the ink stroke data comprises a set of ink points, and wherein two adjacent ink points of the set of ink points are connected by a corresponding ink segment;

defining an ink space coordinate system along the ink stroke, wherein the ink space coordinate system forms a grid along the ink stroke, and the defining of the ink space coordinate system comprises:

assigning a reference line of the ink stroke along the length of the ink stroke that passes through each of the ink points of the set of ink points;

assigning an origin point for the ink stroke on the reference line;

creating ink space coordinates, wherein the creating of the ink space coordinates comprises:

defining ink space x-coordinate values representing a distance along the reference line relative to the origin point; and defining ink space y-coordinate values representing a distance along an axis perpendicular to the reference line of the ink stroke; and for any corners produced by adjacent ink segments of the ink stroke, performing a warping to create curvature in the ink space coordinate system, wherein performing the warping comprises:

warping the ink space x-coordinate values to follow the curvature of the ink stroke by stretching the ink space x-coordinate values on a reflex angle side and compressing the ink space x-coordinate values on an opposite side to the reflex angle side, the reflex angle side and the opposite side being formed by a corner produced by adjacent ink segments; and warping the ink space y-coordinate values to smooth the transitions between the adjacent ink segments of the ink stroke.

2. The method of claim 1, further comprising:
dividing an ink segment of the ink stroke data, using a first dividing line perpendicular to the reference line, into a first half of the ink segment and a second half of the ink segment, wherein the ink segment half and a closest adjacent ink segment produce a straight angle or a corner, the corner produced by the ink segment and the closest adjacent ink segment having a reflex angle side and an opposite side to the reflex angle side;
for the first half of the ink segment, determining a first angle between the first dividing line and a second dividing line, the second dividing line being perpendicular to the reference line and dividing the closest adjacent ink segment into a first half of the closest adjacent ink segment and a second half of the closest adjacent ink segment; and
determining a first bisector of the first angle.

3. The method of claim 2, wherein for the straight angle, performing no warping, and wherein for the corner, performing the warping comprises:
warping the ink space x-coordinate values relative to the origin point for the first half of the ink segment and the second half of the closest adjacent ink segment using the first bisector.

4. The method of claim 3, wherein the warping of the ink space x-coordinate values relative to the origin point comprises:
adjusting ink space x-coordinate values of points on a plane passing through a point on the reference line based on the first bisector, wherein the ink space x-coordinate values on the reflex angle side are stretched towards the first bisector, and wherein the ink space x-coordinate values on the opposite side to the reflex angle side are compressed away from the first bisector.

5. The method of claim 2, wherein performing the warping comprises:
warping the ink space y-coordinate values by:
using the first bisector to determine two anchor points and a control point of the corner produced by the first half of the ink segment and the second half of the closest adjacent ink segment; and
using the two anchor points and the control point to generate a spline at the corner.

6. The method of claim 1, further comprising applying an ink effect to the ink stroke using the ink space coordinate system.

7. One or more computer-readable storage media having instructions stored thereon that when executed by a processor, direct the processor to at least:
receive ink stroke data of an ink stroke, wherein the ink stroke data comprises a set of ink points, and wherein two adjacent ink points of the set of ink points are connected by a corresponding ink segment;
define an ink space coordinate system along the ink stroke, wherein the ink space coordinate system forms a grid along the ink stroke, and the defining of the ink space coordinate system comprises:
assign a reference line of the ink stroke along the length of the ink stroke that passes through each of the ink points of the set of ink points;
assign an origin point for the ink stroke on the reference line;
create ink space coordinates, wherein the creating of the ink space coordinates comprises:
define ink space x-coordinate values representing a distance along the reference line relative to the origin point; and
define ink space y-coordinate values representing a distance along an axis perpendicular to the reference line of the ink stroke; and
for any corners produced by adjacent ink segments of the ink stroke, perform a warping to create curvature in the ink space coordinate system, wherein performing the warping comprises:
warp the ink space x-coordinate values to follow the curvature of the ink stroke by stretching the ink space x-coordinate values on a reflex angle side and compressing the ink space x-coordinate values on an opposite side to the reflex angle side, the reflex angle side and the opposite side being formed by a corner produced by adjacent ink segments; and
warp the ink space y-coordinate values to smooth the transitions between the adjacent ink segments of the ink segments.

8. The media of claim 7, wherein the instructions further direct the processor to at least:
divide an ink segment of the ink stroke data, using a first dividing line perpendicular to the reference line, into a first half of the ink segment and a second half of the ink segment, wherein the ink segment and a closest adjacent ink segment produce a straight angle or a corner, the corner produced by the ink segment and the closest adjacent ink segment having a reflex angle side and an opposite side to the reflex angle side;
for the first half of the ink segment, determine a first angle between the first dividing line and a second dividing line, the second dividing line being perpendicular to the reference line and dividing the closest adjacent ink segment into a first half of the closest adjacent ink segment and a second half of the closest adjacent ink segment; and
determine a first bisector of the first angle.

9. The media of claim 8, wherein for the straight angle, perform no warping, and wherein for the corner, performing the warping comprises:
warp the ink space x-coordinate values relative to the origin point for the first half of the ink segment and the second half of the closest adjacent ink segment using the first bisector.

10. The media of claim 9, wherein the warping of the ink space x-coordinate values relative to the origin point comprises:
adjust ink space x-coordinate values of points on a plane passing through a point on the reference line based on the first bisector, wherein the ink space x-coordinate values on the reflex angle side are stretched towards the first bisector, and wherein the ink space x-coordinate values on the opposite side to the reflex angle side are compressed away from the first bisector.

11. The media of claim 8, wherein performing the warping comprises:
warp the ink space y-coordinate values by:
using the first bisector to determine two anchor points and a control point of the corner produced by the first half of the ink segment and the second half of the closest adjacent ink segment; and
using the two anchor points and the control point to generate a spline at the corner.

12. The media of claim 7, wherein the instructions further direct the processor to apply an ink effect to the ink stroke using the ink space coordinate system.

13. A system comprising:

a processor;

one or more computer-readable storage media; and instructions stored thereon that when executed by the processor, direct the processor to at least:

receive ink stroke data of an ink stroke, wherein the ink stroke data comprises a set of ink points, and wherein two adjacent ink points of the set of ink points are connected by a corresponding ink segment;

define an ink space coordinate system along the ink stroke, wherein the ink space coordinate system forms a grid along the ink stroke, and the defining of the ink space coordinate system comprises:

assign a reference line of the ink stroke along the length of the ink stroke that passes through each of the ink points of the set of ink points;

assign an origin point for the ink stroke on the reference line;

create ink space coordinates, wherein the creating of the ink space coordinates comprises:

define ink space x-coordinate values representing a distance along the reference line relative to the origin point; and define ink space y-coordinate values representing a distance along an axis perpendicular to the reference line of the ink stroke; and for any corners produced by adjacent ink segments of the ink stroke, perform a warping to create curvature in the ink space coordinate system, wherein performing the warping comprises:

warp the ink space x-coordinate values to follow the curvature of the ink stroke by stretching the ink space x-coordinate values on a reflex angle side and compressing the ink space x-coordinate values on an opposite side to the reflex angle side, the reflex angle side and the opposite side being formed by a corner produced by adjacent ink segments; and warp the ink space y-coordinate values to smooth the transitions between the adjacent ink segments of the ink segments.

14. The system of claim 13, wherein the instructions further direct the processor to at least:

divide an ink segment of the ink stroke data, using a first dividing line perpendicular to the reference line, into a first half of the ink segment and a second half of the ink segment, wherein the ink segment and a closest adjacent ink segment produce a straight angle or a corner, the corner produced by the ink segment and the closest adjacent ink segment having a reflex angle side and an opposite side to the reflex angle side;

for the first half of the ink segment, determine a first angle between the first dividing line and a second dividing line, the second dividing line being perpendicular to the reference line and dividing the closest adjacent ink segment into a first half of the closest adjacent ink segment and a second half of the closest adjacent ink segment; and determine a first bisector of the first angle.

15. The system of claim 14, wherein for the straight angle, perform no warping, and wherein for the corner, performing the warping comprises:

warp the ink space x-coordinate values relative to the origin point for the first half of the ink segment and the second half of the closest adjacent ink segment using the first bisector.

16. The system of claim 15, wherein the warping of the ink space x-coordinate values relative to the origin point comprises:

adjust ink space x-coordinate values of points on a plane passing through a point on the reference line based on the first bisector, wherein the ink space x-coordinate values on the reflex angle side are stretched towards the first bisector, and wherein the ink space x-coordinate values on the opposite side to the reflex angle side are compressed away from the first bisector.

17. The system of claim 13, wherein performing the warping comprises:

warp the ink space y-coordinate values by:

using the first bisector to determine two anchor points and a control point of the corner produced by the first half of the ink segment and the second half of the closest adjacent ink segment; and using the two anchor points and the control point to generate a spline at the corner.

* * * * *